(12) United States Patent
Urquidi et al.

(10) Patent No.: US 7,370,853 B2
(45) Date of Patent: May 13, 2008

(54) VIBRATION ISOLATING BUSHING WITH EMBEDDED ANGULAR POSITION SENSOR

(75) Inventors: Carlos A. Urquidi, Chihuahua (MX); Hector H. Rodriguez, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 26 days.

(21) Appl. No.: 11/096,253

(22) Filed: Mar. 31, 2005

(65) Prior Publication Data

US 2006/0220285 A1    Oct. 5, 2006

(51) Int. Cl.
*F16F 5/00*    (2006.01)
(52) U.S. Cl. .................. 267/140.15; 267/276
(58) Field of Classification Search ............. 168/306; 1/266.1; 267/141.2, 1, 141.7, 276, 281, 294, 267/140.12, 140.15
See application file for complete search history.

(56) References Cited

U.S. PATENT DOCUMENTS

| | | | |
|---|---|---|---|
| 3,060,370 A | 10/1962 | Varterasian | |
| 3,510,143 A | 5/1970 | Carpenter | 280/6 |
| 3,751,061 A | 8/1973 | Scheuerpflug | 280/96.2 R |
| 3,779,581 A | 12/1973 | Scheuerpflug | 280/95 R |
| 4,168,840 A | 9/1979 | Graham | 280/6 R |
| 4,319,236 A | 3/1982 | Brace et al. | 340/679 |
| 4,349,735 A | 9/1982 | Maeda | 260/229 |
| 4,624,477 A | 11/1986 | Kumagai et al. | 280/707 |
| 4,642,496 A | 2/1987 | Kerviel et al. | 310/68 B |
| 4,667,943 A | 5/1987 | Izumi et al. | 267/141.3 |
| 4,706,988 A | 11/1987 | Young | 280/676 |
| 4,756,374 A | 7/1988 | Bailey et al. | 177/137 |
| 4,838,563 A | 6/1989 | Konishi et al. | 280/840 |
| 4,858,899 A | 8/1989 | Saotome et al. | 267/219 |
| 4,961,650 A | 10/1990 | Schwarzbich | 384/49 |

(Continued)

FOREIGN PATENT DOCUMENTS

CA    2 482 121    3/2003

(Continued)

OTHER PUBLICATIONS

W. Beitz, H.Küttner: "Dubbel, Taschenbuch für den Maschinenbau, 17, Auflage", 1990, Springer verlag, Berlin. XP002388450, p. W11, Paragraph 2.4.4.

(Continued)

*Primary Examiner*—Bradley King
(74) *Attorney, Agent, or Firm*—Paul L. Marshall (57) ABSTRACT

A bushing assembly adapted for application in vehicle suspension systems includes an outer, generally cylindrical bushing member, an inner generally cylindrical bushing member arranged concentrically within the outer member. The two bushing members are interconnected by an elastomeric member disposed there between and bonded thereto to permit limited rotational displacement between the external and internal bushing members. An angular position sensor is at least partially embedded within the elastomeric member and operative to produce an output signal indicative of the relative angular position of the external and internal bushing members. The sensor includes a stator assembly including a permanent magnet, a galvanomagnetic sensing element and a flux guide defining at least one pole face, and a rotor including a flux guide defining a second pole face. An air gap between the two pole faces varies dimensionally as a function of the relative angular position of the stator assembly and rotor.

19 Claims, 10 Drawing Sheets

U.S. PATENT DOCUMENTS

| | | |
|---|---|---|
| 5,031,934 A | 7/1991 | Soltis .................... 280/840 |
| 5,165,668 A * | 11/1992 | Gennesseaux ......... 267/140.15 |
| 5,253,735 A | 10/1993 | Larson et al. ............ 188/1.11 |
| 5,261,748 A | 11/1993 | Kameda .................... 384/222 |
| 5,497,081 A | 3/1996 | Wolf et al. ............ 324/207.12 |
| 5,573,263 A | 11/1996 | Denny et al. ............ 280/509 |
| 5,814,999 A | 9/1998 | Elie et al. |
| 5,922,953 A | 7/1999 | Payne et al. ............. 73/494 |
| 6,126,177 A | 10/2000 | Steinert ..................... 280/5.5 |
| 6,181,997 B1 | 1/2001 | Badenoch et al. ........... 701/37 |
| 6,219,602 B1 | 4/2001 | Badenoch et al. ........... 701/37 |
| 6,232,771 B1 | 5/2001 | Herden et al. ......... 324/207.25 |
| 6,293,511 B1 | 9/2001 | Shepherd ................ 248/441.1 |
| 6,370,458 B1 | 4/2002 | Shal et al. |
| 6,397,134 B1 | 5/2002 | Shal et al. |
| 6,446,993 B1 | 9/2002 | Huszarik et al. ...... 280/124.177 |
| 6,465,607 B2 | 10/2002 | Taguchi et al. ............. 528/480 |
| 6,489,761 B1 | 12/2002 | Schroeder et al. ..... 324/207.25 |
| 6,566,864 B1 | 5/2003 | Brown et al. ............ 324/207.2 |
| 6,614,223 B2 | 9/2003 | Schroeder et al. ..... 324/207.22 |
| 6,668,222 B2 | 12/2003 | Shal et al. .................... 701/37 |
| 6,766,239 B2 | 7/2004 | Barron et al. ................ 701/71 |
| 6,777,928 B2 | 8/2004 | Ramirez ................ 324/207.25 |
| 6,883,967 B2 * | 4/2005 | Robb et al. .................. 384/536 |
| 2003/0107163 A1 | 6/2003 | Asano et al ........... 267/140.12 |
| 2003/0137291 A1 | 7/2003 | Wendel et al. |
| 2004/0190805 A1 | 9/2004 | Ersoy et al. |
| 2004/0201196 A1 | 10/2004 | Katagiri et al ........ 280/124.134 |
| 2005/0121219 A1* | 6/2005 | Pohl ......................... 174/65 G |

FOREIGN PATENT DOCUMENTS

| | | |
|---|---|---|
| DE | 100 14 980 | 4/2001 |
| DE | 10255234 A1 * | 6/2004 |
| FR | 2 858 673 | 2/2005 |
| GB | 2143328 A | 2/1985 |
| JP | 01199033 A * | 8/1989 |
| JP | 4-20812 | 1/1992 |
| WO | 00/59746 | 12/2000 |
| WO | 00/59747 | 12/2000 |

OTHER PUBLICATIONS

European Search Report dated Jun. 30, 2006.
European Search Report dated Jul. 4, 2006.
European Search Report dated Jun. 30, 2006.

* cited by examiner

VIBRATION ISOLATING BUSHING WITH EMBEDDED ANGULAR POSITION SENSOR

RELATED PATENT APPLICATION

This application relates to corresponding U.S. Pat. Application No. 11/095,765, filed 31 Mar. 2005, entitled "Angular Position Sensor" identified as applicant docket no. DP-313694, and owned by a common assignee of interest.

TECHNICAL FIELD

The present invention relates generally to position sensors, and, more particularly, to contactless sensors for measuring the relative angular position between relatively rotatable objects, and, more particularly still, to the integration of such sensors within bushing systems such as those applied with automotive suspension systems.

BACKGROUND OF THE INVENTION

Angular and linear position systems are widely used in automatic control systems as feedback-sensing devices in one or more control loops of the system. In the automotive industry, a relatively recent trend is providing control-by-wire in lieu of the more traditional control provided by mechanical linkages, such as cables, rods and the like.

With the goal of improving drive stability of automotive vehicles, mechanically assisted driver control has been studied as a way to reduce uncontrolled vehicle behavior, such as body yaw and roll, as well as skidding. Specifically, antilock braking systems has already come into use as means for preventing locking of the wheels during breaking. Additionally, there are proposed vehicle control systems such as traction control, which reduces wheel spin during acceleration, or vehicle stability control, which affords overall control of stabilization of vehicle behavior.

In recent years, various vehicular height regulator systems or vehicular height control systems have been developed for regulating vehicle body attitude. For example, one such vehicle height control system is disclosed in U.S. Pat. No. 4,838,563 to Konishi et al.

For providing accurate vehicular height control, it is essential that the vehicle height indicative signal generated by the vehicle height sensor accurately correspond to the actual height of the vehicle body. In order to make the vehicle height indicative signal value accurately correspond to the actual height, accurate alignment of the vehicle height sensor in mounting the sensor on the vehicle body becomes essential.

In the conventional process to adjust alignment of the vehicle height sensor in mounting the sensor on the vehicle body, a pivotal arm of a vehicle height sensor is fixed at a certain angular position, at which the sensor produces a vehicle height indicative signal indicative of the vehicular height coincident with a preset target vehicle height, by means of a pin. At this condition, the vehicle height sensor is fixed onto the vehicle body. Thereafter, a test load is applied to the vehicle body to adjust the vehicle height so that the height level of a suspension member, such as a suspension link or suspension arm, becomes equal to the highest level of the arm of the vehicle height sensor. Then, the sensor arm and the suspension member are rigidly connected for cooperation with one another. Thereafter, the shearing load is exerted on the pin to shear the pin to release the sensor arm from restriction. Also, the test load exerted on the vehicle body is released.

Such conventional processes require additional parts, such as a pin for fixing the sensor arm relative to the sensor body, and an additional jig for applying the test load. Furthermore, the aforementioned process requires substantial attention to cause lowering of efficiency in adjusting alignment of the vehicle height sensor, further increasing costs.

More recently, position sensors have come into use in a wide variety of related applications, such as such as determining the relative movement of a vehicle suspension system with respect to a supported vehicle body. Conventional suspension-type position sensors typically include a linear-type motion sensor that utilizes capacitor plates or an inductor to determine the distance between a component of the vehicle suspension system and the vehicle body.

Heretofore, the sensors and mechanical linkages used in connection therewith to determine the relative movement of a vehicle suspension system with respect to a vehicle body have been limited by the construction being placed within the respective vehicle in a location, which provides only linear of the vehicle suspension system with respect to the vehicle body. These placement limitations are a result of not only the construction of the sensor itself, but also of the mechanical linkages used to connect the sensor to a component of the vehicle suspension system and a component of the vehicle body.

Currently, electronically controlled suspension systems often require semi-active suspension systems or active suspension systems to provide active damping for a vehicle. In such suspension systems, sensors supply input signals, including vehicle suspension position, to an electronic control unit on a real time basis. This increased functionality requires that more and more sensors be incorporated within the vehicle body and suspension system, making sensor packaging, as well as cost, complexity and robustness, more and more problematic.

BRIEF DESCRIPTION OF THE INVENTION

Generally, the present invention fulfills the forgoing needs by providing, in one aspect thereof, a sensor assembly for measuring angular position. The sensor comprises a stator, which includes a magnet, a galvanomagnetic sensing element and a flux guide in a single assembly. The stator defines at least one pole face. The sensor also comprises a rotor, which is positioned for at least relative angular rotation with respect to the stator. The rotor includes a flux guide also defining a pole face. The stator and rotor pole faces are juxtapositioned and configured to establish an air gap there between, which varies dimensionally as a function of the relative angular position of the stator and rotor.

The present invention provides a robust, low cost angular position sensor configuration. The magnet, galvanomagnetic sensing element and a portion of the flux guide system are formed as a single rigid assembly. The only variable in the operation of the sensor is the effective air gap. The remainder of the flux guide system is mounted for limited rotation between limits of travel to ensure contactless operation. This arrangement has the advantage of requiring only one, relatively small permanent magnet and a single Hall effect sensor.

According to the preferred embodiment of the invention, a permanent magnet is employed in conjunction with a Hall effect sensor to form an elongated stator, which forms an opposed pole face at each end, which are mirror-image and radially tapered. Likewise, the rotor has a generally annular flux guide defining circumferentially opposed, radially tapered pole faces which are juxtapositioned with the stator poles to form respective air gaps there between. This arrangement has the advantage of a compact, robust design that can be easily tailored for a given application and expected range of relative rotation between the stator and rotor.

According to another aspect of the invention, means are provided to resiliently urge the sensor rotor and stator into a predetermined null position. This arrangement has the advantage of defining a range of operation without the necessity of employing hard stops, and preserve contactless operation.

According to another broad aspect of the present invention, the rotary position sensor is substantially imbedded within a bushing assembly. Specifically, the bushing assembly comprises a generally cylindrical outer member and a generally cylindrical inner member disposed substantially concentrically with the outer member. A generally annular elastomeric member is disposed between the inner and outer members and is bonded thereto to maintain axial alignment of the inner and outer members and, in application, provide resilient vibration damping there between. Finally, a sensor is at least partially imbedded within and supported by the elastomeric member. The sensor is operative to produce an output signal indicative of the relative angular position of the inner and outer members.

According to another aspect of the invention, the elastomeric member is bifurcated and the two halves axially separated to form a cavity there between. The sensor is centrally located between the elastomeric member halves. This arrangement has the advantage of hermetically sealing the sensor assembly, thus protecting it from harsh environmental effects found in many intended applications, such as automotive suspensions.

According to another aspect of the invention, the inner and outer members are formed of hardened steel and the elastomeric member is molded of solid rubber. This implementation allows the present invention to be conveniently packaged in a space traditionally reserved for a bushing alone. Restated, the present invention permits packaging of a rotary position sensor within an automotive suspension system without requiring any other offsetting design compromises.

According to yet another aspect of the invention, positioning indicators or indicia are provided on an outer surface of both the inner and outer members to confirm proper installation and orientation of the major sensor components.

According to still another aspect of the invention, means are provided to fix the relative rotational positions of the inner member and the stator as well as the relative rotational positions of the outer member and the rotor. This feature ensures proper orientation of the sensor components.

These and other features and advantages of this invention will become apparent upon reading the following specification, which, along with the drawings, describes preferred and alternative embodiments of the invention in detail.

BRIEF DESCRIPTION OF THE DRAWINGS

The present invention will now be described, by way of example, with reference to the accompanying drawings, in which.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplifications set out herein illustrate preferred and alternative embodiments of the invention and such exemplifications are not to be construed as limiting the scope of the invention in any manner.

DETAILED DESCRIPTION OF THE PREFERRED AND ALTERNATIVE EMBODIMENTS OF THE INVENTION

The present invention is intended for application in automotive vehicle suspension systems and will be described in that context. It is to be understood, however, that the present invention could also be successfully applied in many other applications. Accordingly, the claims herein should not be deemed as limited to the specifics of the preferred application as described hereunder.

The preferred embodiment of the present invention serves as both a bushing for mounting suspension system components to an automotive vehicle as well as a sensor to monitor the position of selected suspension components while the vehicle is in operation.

Figure 1:
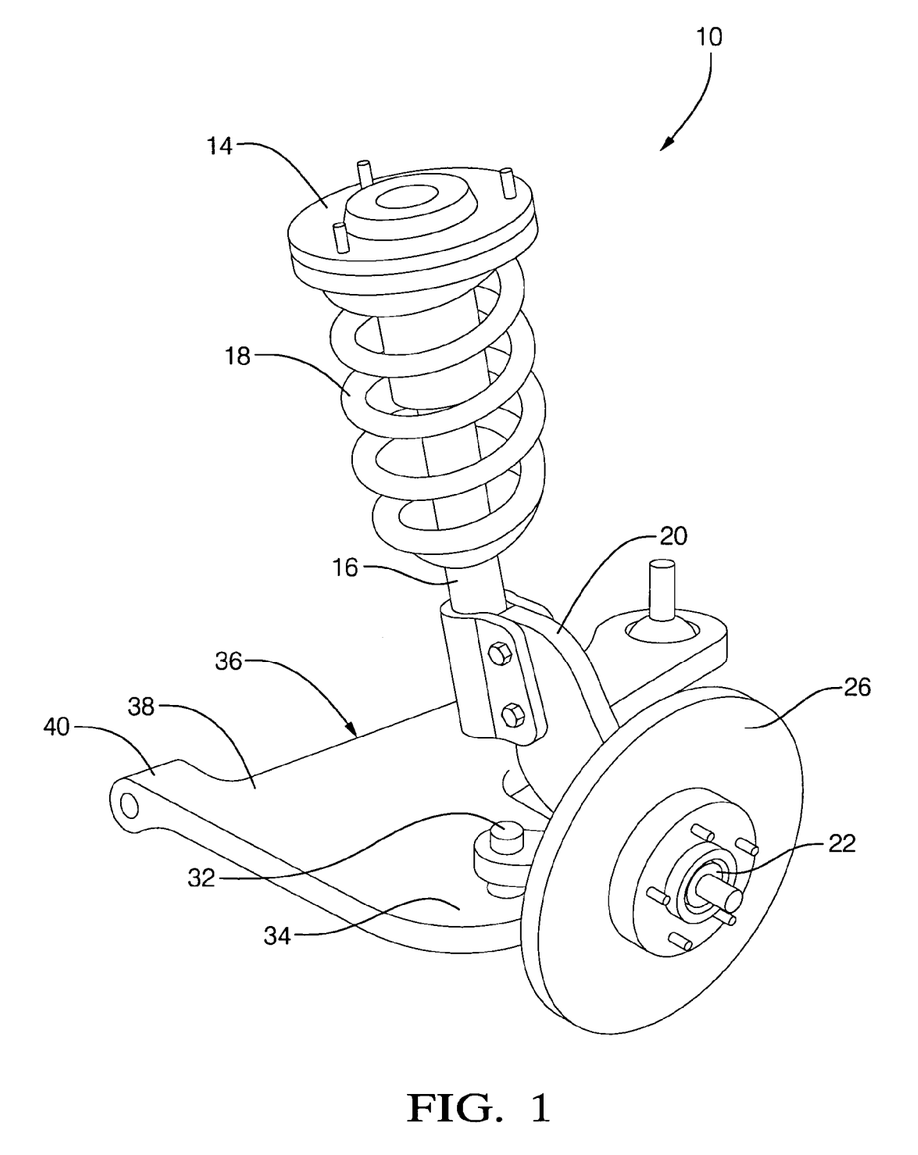
FIG. 1, is a perspective view of an automotive front suspension system in which the present invention can be applied.
Figure 2:
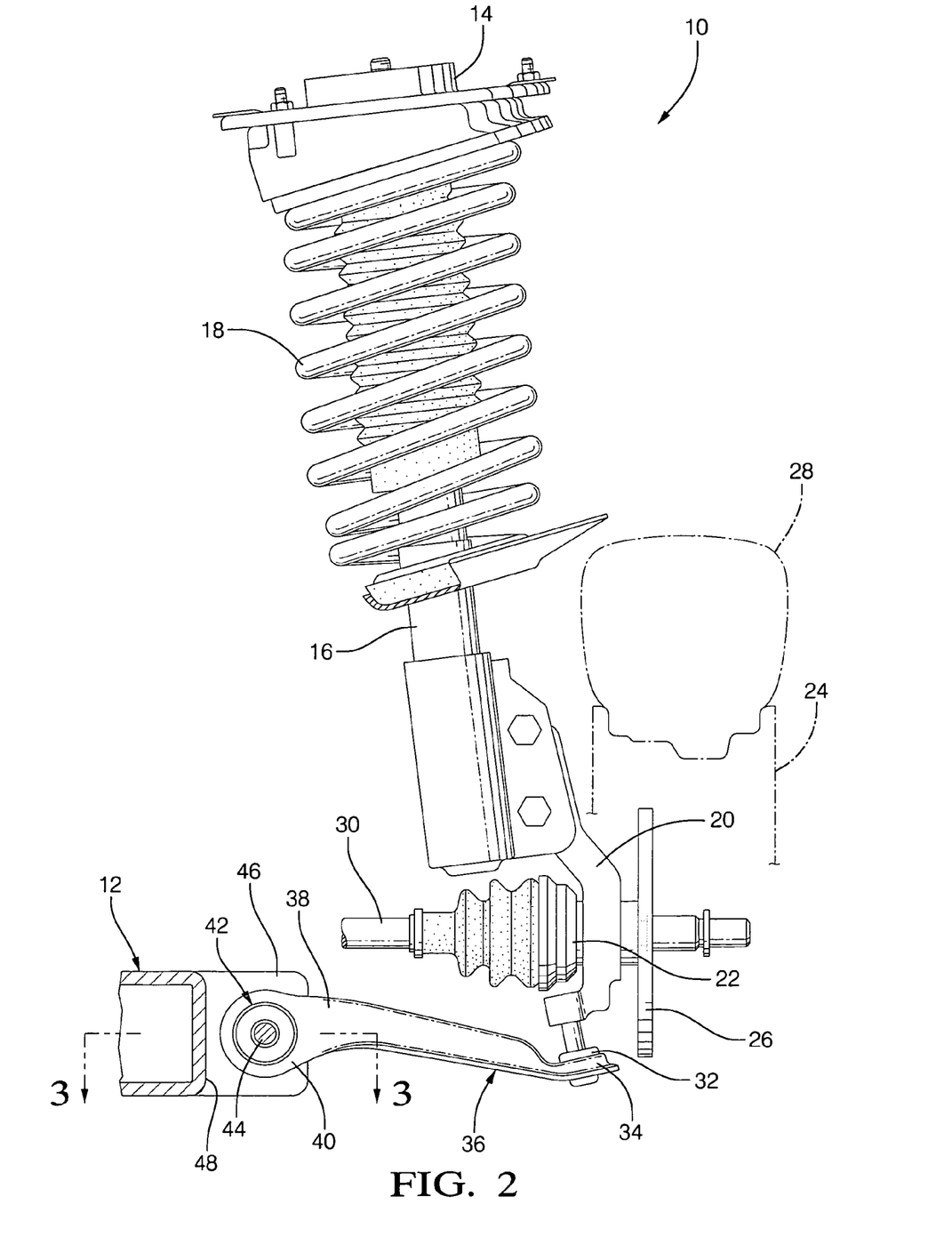
FIG. 2, is a front plan view, on an enlarged scale, of the suspension system of FIG. 1 with its point of interface with a mating vehicle body illustrated in broken away cross-section taken on lines 3-3 from FIG. 3.

Referring to FIGS. 1 & 2, an automotive vehicle front wheel drive front suspension assembly 10 includes a shock tower (not illustrated) formed of sheet metal that is rigidly connected to the frame 12 of the host vehicle. Mounted to the shock tower is a strut tower cap 14 which, in turn, is mounted to a McPherson strut 16. The McPherson strut 16 is surrounded by a spring 18.

At its lower end, the McPherson strut 16 is connected to a knuckle assembly 20. The knuckle assembly 20 has rotatively mounted therein a hub/bearing unit 22. The vehicle wheel 24 (in phantom) is connected to the hub/bearing unit 22. A brake rotor 26 is disposed between the hub 22 and the wheel 24. A pneumatic tire 28 (in phantom) is mounted to the vehicle wheel 24 and is rotatively powered by a half-shaft 30, which is rotated by the transaxle (not illustrated), which is typical of many front wheel drive vehicles.

The lower end of the knuckle assembly 20 is mounted for multi-axis pivotal movement upon a ball joint 32. The ball joint 32 is mounted on a lateral arm 34 of a lower control arm assembly 36. The lower control arm assembly 36 has a front arm 38 with a horizontally extending cylindrical end 40. Cylindrical end 40 mounts a lower control arm front bushing 42 that receives a horizontal pin 44. The horizontal pin 44 connects the lower control arm front arm 38 with a front pivot bracket 46 rigidly fixed to the frame 12. When in the assembled position, cylindrical end 40 is captured within a pocket 48 defined by bracket 46. The lower control arm 36 is also pivotally connected with a sway shaft (not illustrated) to control vehicle roll during cornering maneuvers.

As best depicted in FIG. 2, frame 12 and bracket 46 constitute a first structural member, which is substantially fixed with respect to the host automotive vehicle. Control arm assembly 36, including front arm 38 and horizontally extending cylindrical end 40, constitute a second structural member which is displaceable with respect to frame 12. As illustrated, control arm assembly 36 is joined to the frame 12 by bushing 42 for limited relative rotation about an axis defined by horizontal pin 44.

Figure 3:
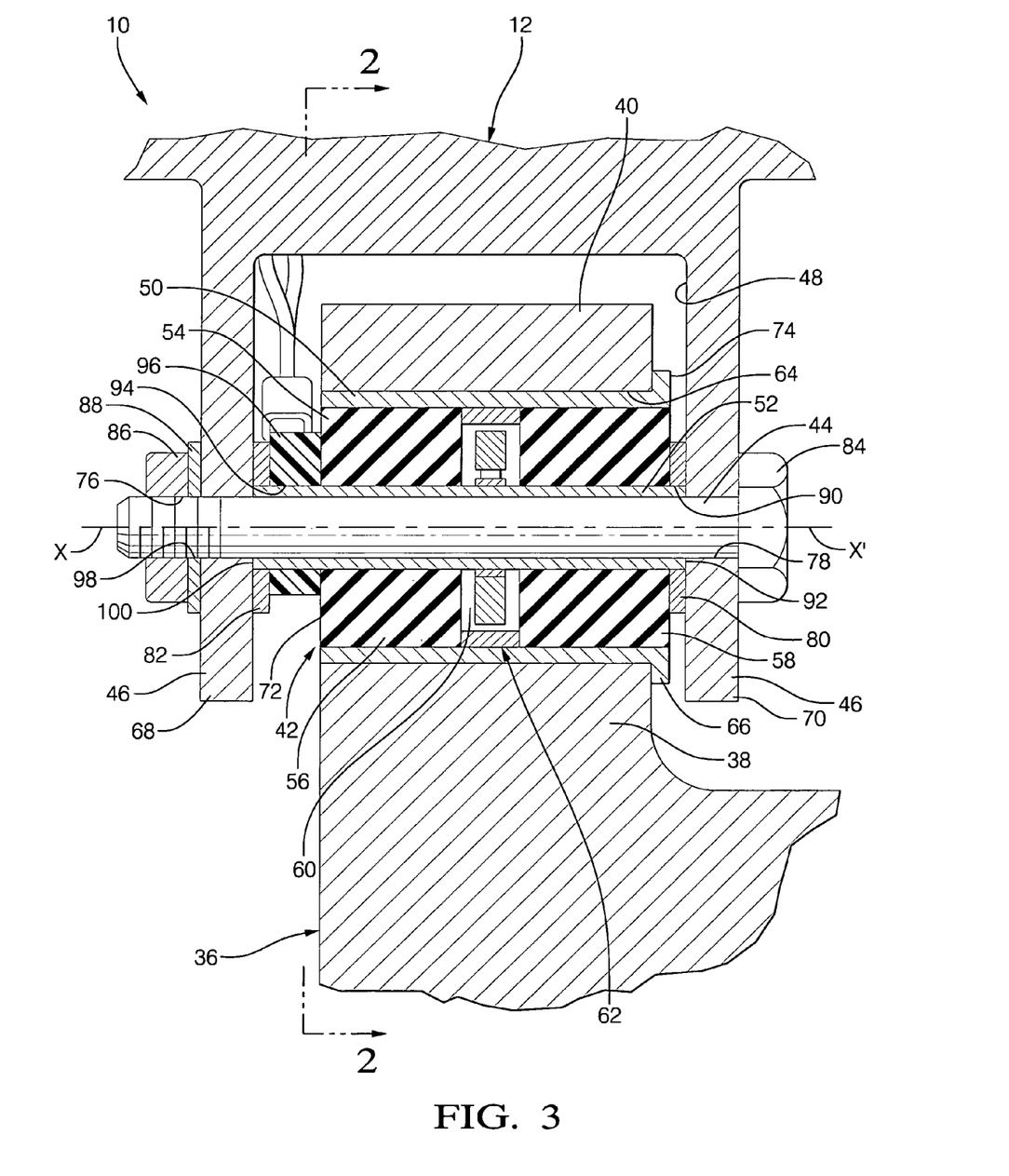
FIG. 3, is a broken away portion, on a still enlarged scale, of the vehicle body-suspension interface taken on lines 2-2 from FIG. 2.

Due to the extreme structural complexity of a typical modern automobile suspension systems, FIGS. 1, 2 and 3 have been significantly simplified to eliminate unnecessary detail for the sake of clarity. Further elaboration on this point can be gleaned from existing patent literature. For example, U.S. Pat. No. 6,446,993 to Huszarik et al. describes automotive vehicle front wheel suspension assemblies in detail and is incorporated herein by reference.

Referring to FIG. 3, the bushing 42 is illustrated in application with the surrounding structure of the control arm assembly 36 and vehicle frame 12. The bushing 42 serves, in combination with the horizontal pin 44, to join the control arm assembly 36 to the vehicle frame 12 so as to permit limited relative rotation there between about an axis X-X' defined by pin 44 while preventing significant axial, radial and rotational displacement there between.

The bushing 42 is an assembly comprising a cylindrical external metal member or bushing tube 50, a cylindrical internal metal member or bushing tube 52 disposed concentrically with the external bushing tube 50 and an intermediate elastomeric member 54 disposed concentrically with the external and internal bushing tubes, 50 and 52, respectively. Elastomeric member 54 is preferably former of hard natural or synthetic rubber and is bifurcated into left and right half-portions, 56 and 58, respectively, axially spaced to form a closed cavity 60 there between.

An angular position sensor assembly 62 is nestingly disposed within closed cavity 60. The structure and function of position sensor assembly 62 will be described in detail herein below.

The position sensor assembly 62 can be assembled in its illustrated configuration within the bushing assembly 42 along with elastomer half-portions 56 and 58, which have been pre-molded and subsequently bonded to the inner diameter surface of the external bushing tube 50 and outer diameter surface of the internal bushing tube 52. Alternatively, elastomeric member 54 can be molded in place to simultaneously encapsulate the position sensor 62 and resiliently bond external and internal bushing tubes 50 and 52, respectively.

Although the external and internal bushing tubes are permanently interconnected by elastomeric member 54, its natural resiliency permits limited relative displacement there between when opposing forces are applied to external and internal bushing tubes 50 and 52, respectively. When such opposing forces are removed, the bushing tubes 50 and 52 will be resiliently urged back to their original positions.

In application, as illustrated in FIG. 3, the external bushing tube 50 of the bushing assembly 42 is affixed to control arm assembly 36 by press fitting the outer diameter surface of the external bushing tube 50 within a through bore 64 in the cylindrical end 40 of the front arm 38 of the control arm assembly 36. Such press interfit constitutes engagement means, which fixedly secures the external bushing tube 50 of bushing assembly 42 for movement with the control arm assembly. Alternatively, means to index the external bushing tube 50 with the cylindrical end 40 of front arm 38 could also assure such affixation.

One end of external bushing tube 50 forms a radially outwardly extending flange 66 which serves as a stop to precisely axial position the bushing 42 within bore 64.

Spaced, generally parallel ears 68 and 70 of bracket 48 straddle the left and right axial ends, 72 and 74, respectively, of bushing assembly 42. Through bores 76 and 78 formed in bracket ears 68 and 70, respectively, are concentrically aligned with axis X-X'. Pin 44, which is illustrated as a through bolt extends through bracket ear 70, a first spacer 80, the inner diameter passage formed by internal bushing tube 52, a second spacer 82 and bracket ear 68. Pin 44 is retained in its illustrated position by a head 84 at one end and a threaded nut 86 and washer 88 at the opposite end.

As viewed in FIG. 3, internal bushing tube 52 extends rightwardly through an enlarged center bore 90 in spacer 80. The right end surface 92 of internal bushing tube 52 abuts the adjacent facing wall of bracket ear 70. Furthermore, the internal bushing tube 52 extends leftwardly through a through bore 94 formed in an electrical connector assembly 96, the function of which will be described herein below, and an enlarged center bore 98 of spacer 82. The left end surface 100 of internal bushing tube 52 abuts the adjacent facing wall of bracket ear 68.

When installed as illustrated in FIG. 3, the internal bushing tube 52 and the pin 44 are fixedly attached to the host vehicle body via the frame 12 and pivot bracket 46 and will not move, even upon limited rotation of the control arm assembly 36 and external bushing tube. This is accomplished by the clamping of the ends 92 and 100 of the internal bushing tube 52 by the ears 68 and 70 of bracket 46 combined with a press fit of pin 44 within through bores 76 and 78 and internal bushing tube 52. Such press interfit constitutes engagement means, which fixedly secures the internal bushing tube 52 of bushing assembly 42 for movement (grounding) with the vehicle frame 12 and mounting bracket 46. Alternatively, means to index the internal bushing tube 52 with the bracket 46 and frame 12 could also assure such fixation.

Thus assembled, the instantaneous relative angular position between the control arm assembly 36 and vehicle frame 12 corresponds to the relative angular position between the external and internal bushing tubes 50 and 52, respectively, of the bushing assembly 42.

In addition to serving to mount and support the control arm assembly 36 and related sprung vehicle suspension components, the bushing assembly 42 provides vibration damping and isolation to improve the drivability of the host automotive vehicle. This aspect of its functioning is well described in the patent literature. For example, U.S. Pat. No. 6,465,607 to Taguchi et al. and U.S. Patent Application Publication U.S. 2003/0107163 to Asano et al. describe design criteria for elastomeric bushing elements for passenger vehicle suspensions.

Figure 4:
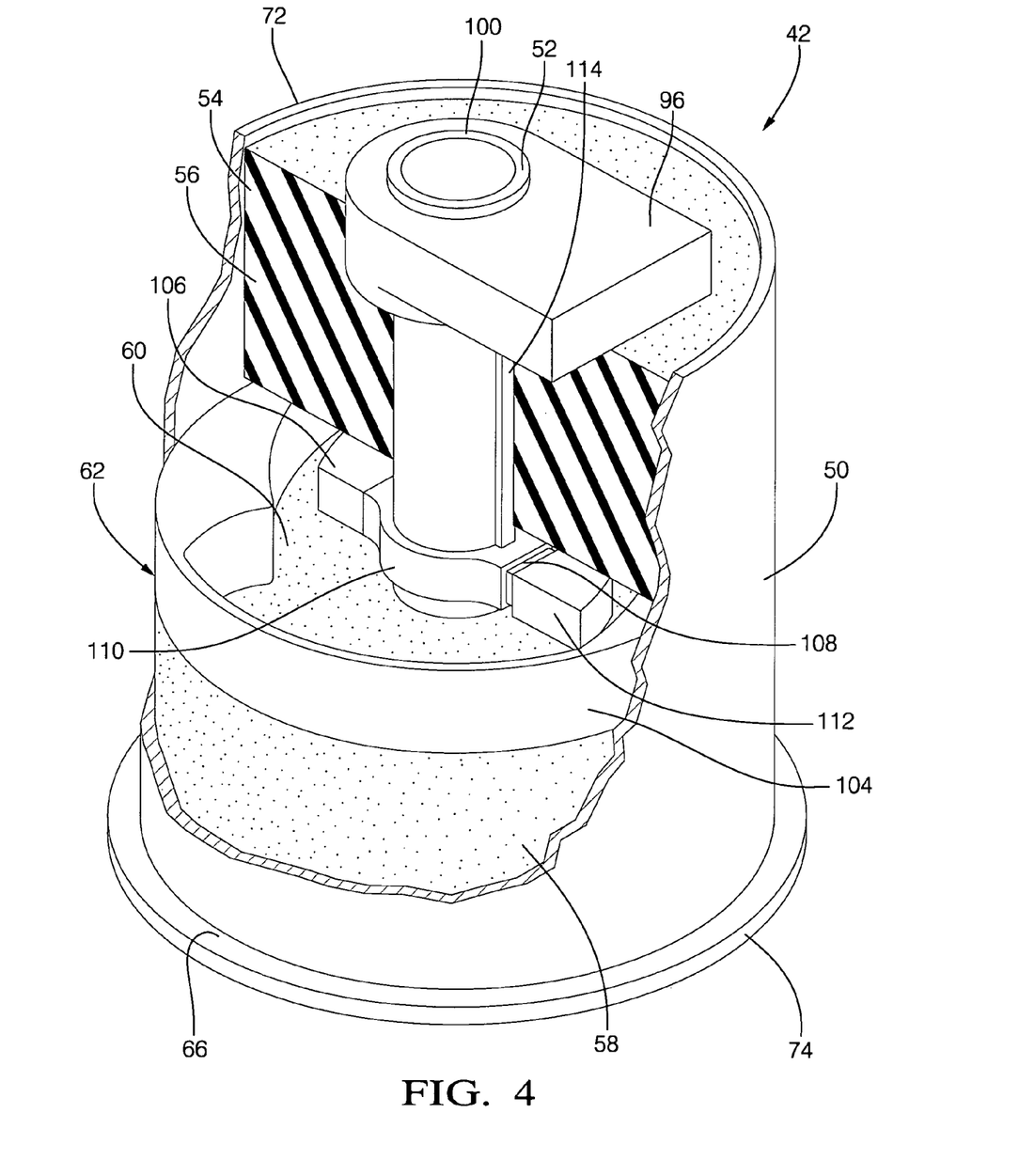
FIG. 4, is a cut-away perspective view of a bushing with embedded sensor assembly representing the preferred embodiment of the present invention.
Figure 5:
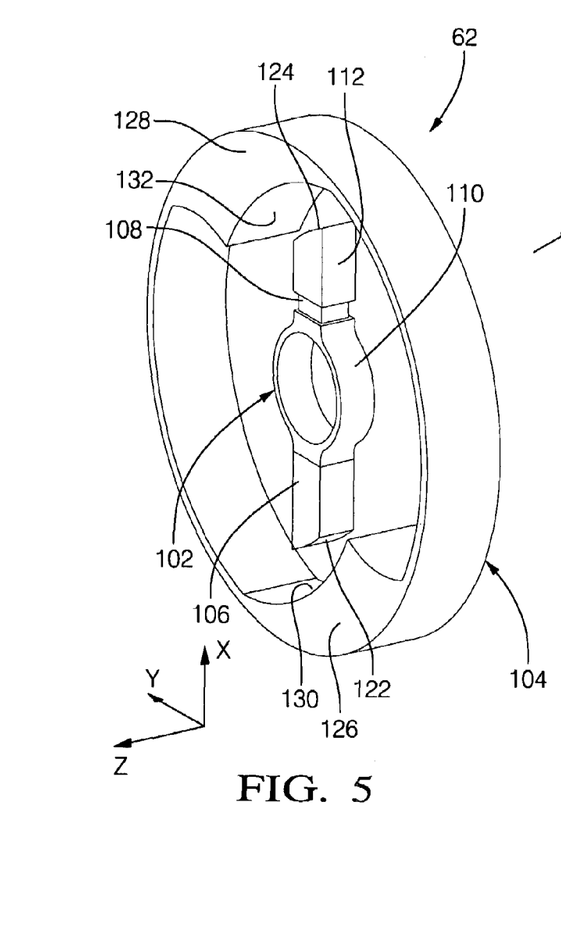
FIG. 5, is a perspective view of the preferred embodiment of the sensor assembly of the present invention taken from the bushing/sensor assembly of FIG. 4.
Figure 6A:
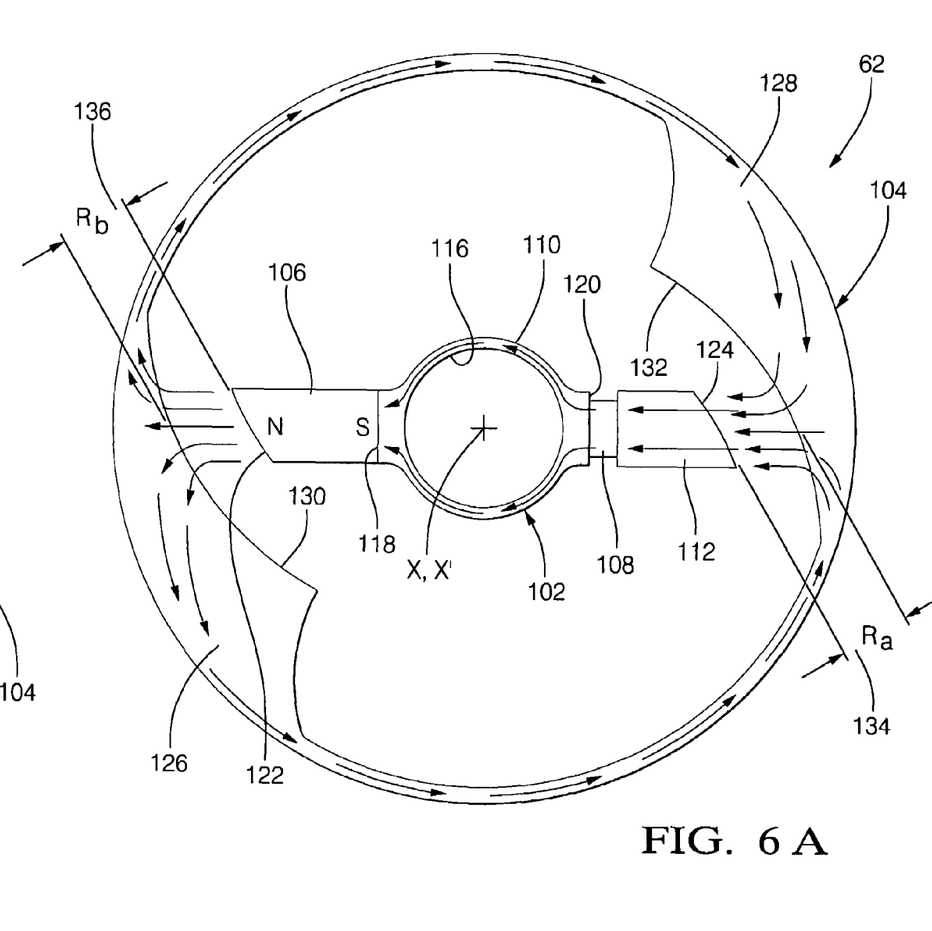
FIG. 6A, is a top plan view of the sensor assembly of FIG. 5, on an enlarged scale with the stator and rotor in the null position.

Referring to FIGS. 4, 5 and 6A, the preferred structure and operation of the angular position sensor assembly 62 is illustrated. Position sensor 62 comprises an armature or stator assembly 102 and a rotor ring 104. As best viewed in FIG. 4, stator assembly 102 is mounted to the outer surface of internal bushing tube 52 within pocket 60 and extends radially outwardly therefrom. Rotor ring 104 is mounted to the inner surface of external bushing tube 50 concentrically with stator assembly 102 and extends radially inwardly therefrom. Thus, stator assembly 102 will remain relatively stationary with respect to the vehicle frame 12, while the rotor ring 104 will undulate in unison with movement of the control arm assembly 36.

The position sensor assembly 62 is hermetically sealed within the sealed pocket 60 within bushing assembly 42. The stator assembly 102 comprises a permanent magnet 106, a galvanomagnetic sensing element 108, a first flux guide element 110 and a second flux guide element 112. Flux guide elements 110 and 112 are constructed of magnetically conductive material. Galvanomagnetic sensing element 108 is electrically in-circuit with a host vehicle control/power circuit (not illustrated) via a connection route 114 dressed externally adjacent the internal bushing tube 52 interconnecting the sensing element 108 with the electrical connector assembly 96. As connection route 114 passes through left half-portion 56 of elastomeric member 54, it maintains the hermetic seal of pocket 60.

Referring to FIGS. 5 and 6A, the stator assembly 102 forms a generally elongated structure with the basic components series connected. The first flux guide element 110 is generally in the form of an annular ring, defining a central through passage 116 and radially outwardly facing opposed parallel flat mounting surfaces 118 and 120 aligned normally to the line of elongation. Permanent magnet 106 is bonded to mounting surface 118 with its magnetic poles ordered parallel to the line of elongation. The end of magnet 106 opposite mounting surface 118 is radially tapered and curvilinear in shape to define a first stator pole face.

Galvanomagnatic sensing element 108 is bonded to second mounting surface 120 with its sensing planes aligned normally to the line of elongation of stator assembly 102. Second flux guide element 112 is, in turn, bonded to the galvanomagnetic sensing element. Second flux guide element 112 extends radially outwardly, ending in a radially tapered and curvilinear shape to define a second stator pole face 124. Stator pole faces 122 and 124 are preferably identical in surface area, shape and radial displacement from axis X-X'. Galvanomagnetic sensing element 108 is preferably a Hall effect sensor. However, it could be a magnetoresistive or other suitable sensor type.

Stator assembly 102 is carried by internal bushing tube 52 extending through central through passage 116 with a press interfit or bonding to ensure robust interconnection.

Rotor ring 104 is formed as a solid, substantially annular ring of magnetically conductive material. Rotor ring 104 defines two similar radially thickened circumferentially opposed generally crescent-shaped poles 126 and 128. The poles 126 and 128 define first and second tapered and curvilinear rotor pole faces 130 and 132.

To facilitate a clear understanding of the relative positional relationships between the bushing assembly 42 and the angular position sensor assembly 62 in general and the position sensor stator assembly 102 and rotor ring 104 in particular, a common 3-dimensional Cartesian coordinate system is denoted in FIGS. 5, 6A, 7A-7E, 8A-8C and 10, referencing axes X, Y and Z as required. The X axis corresponds with the line of elongation of the sensor stator assembly 102. The Z axis corresponds with the axis of revolution of the bushing assembly 42 and pin 44 designated as X-X' in FIG. 3. The Y axis is normal to both axes X and Z and passes through the intersection thereof.

The applicants believe that for certain passenger car applications, one would expect a displacement of the front wheel control arm assemblies to be in the range of +15 degrees to −15 degrees from the nominal (at rest with the weight of the host vehicle applied) position under normal operating conditions. One would thus expect that such a traversal range will result in the rotor ring 104 rotating through a similar +15 degrees to −15 degrees from the nominal or null position, with respect to the stator assembly 102.

Figures 6B, 6C, 7A:
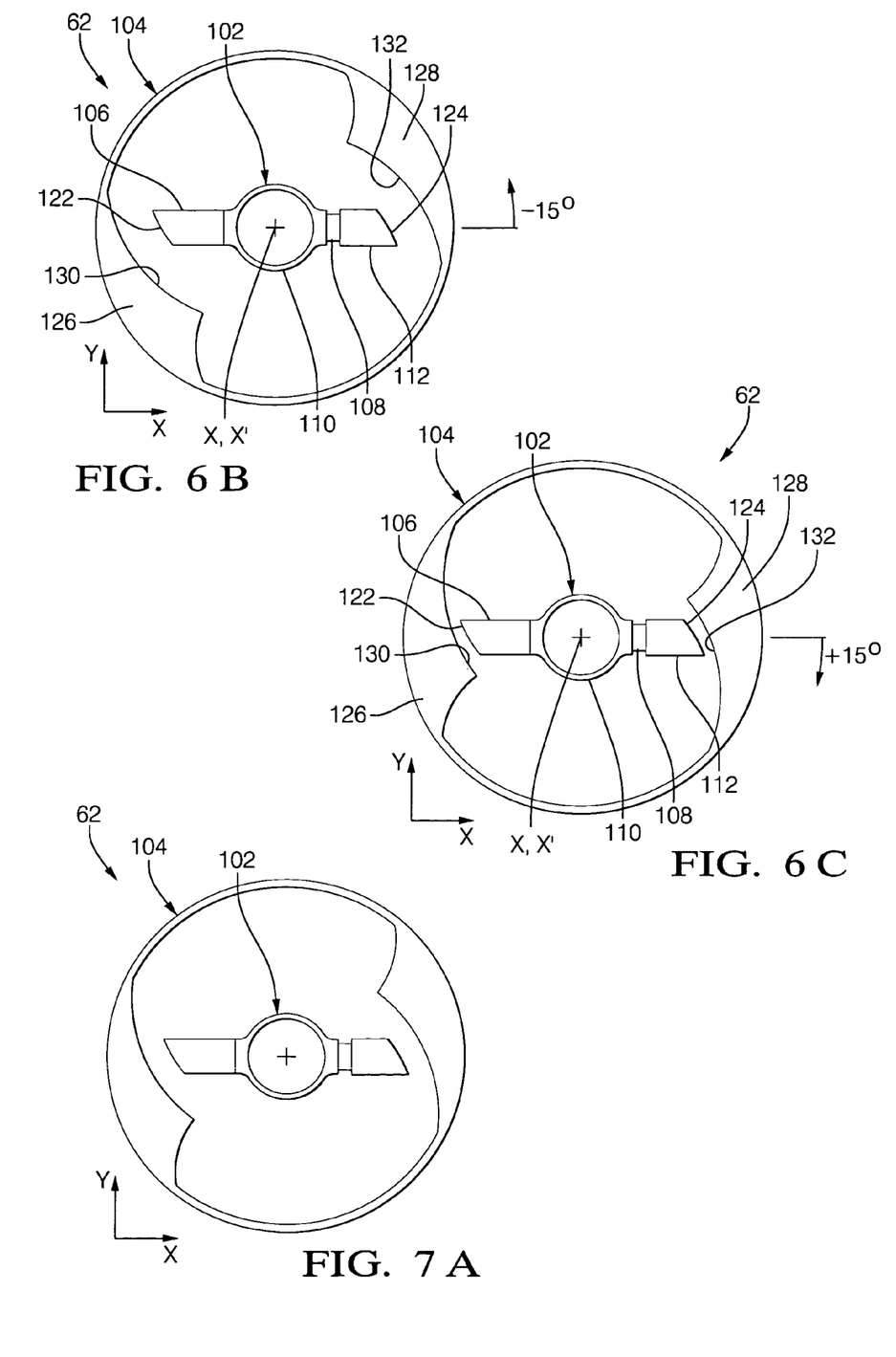
FIG. 6B, is a top plan view of the sensor assembly of FIG. 6A, on a reduced scale, and with the stator and rotor in a first respective end-of-travel juxtaposition.
FIG. 6C, is a top plan view of the sensor assembly of FIG. 6A, on a reduced scale, and with the stator and rotor in a second respective end-of-travel juxtaposition.
FIG. 7A, is a top plan view similar to that of FIG. 6A, on a reduced scale.

Referring to FIGS. 6A through 6C, the full range of relative rotational travel between the stator assembly 102 and the rotor ring 104 is illustrated. FIG. 6A illustrates the rotor ring 104 in the null position wherein there is no resilient deformation of the elastomeric member 54 and resulting torsional loads acting between the stator assembly 102 and rotor ring 104. In this condition, stator pole faces 122 and 124 are roughly centered circumferentially with their corresponding opposed rotor pole faces 130 and 132, respectively. FIG. 6B shows the rotor ring 104 rotationally repositioned −15 degrees from the null position into a first limit of travel. Conversely, FIG. 6C shows the rotor ring 104 rotationally repositioned +15 degrees from the null position into a second limit of travel.

The magnetic circuit established by the angular position sensor 62 comprises a closed loop, series connection of the stator assembly 102 (consisting of the first stator pole face 122, the permanent magnet 106, the first flux guide element 110, the Hall effect flux sensing element 108, the second flux guide element 112 and the second stator pole face), a first air gap 134 designated Ra between stator pole face 124 and rotor pole face 132, the rotor ring 104 (consisting of the second rotor pole face 132, the second rotor pole 128, the unnumbered interconnecting ring portions, the first rotor pole 126 and the first rotor pole face 130) and a second air gap 136 designated Rb between rotor pole face 130 and stator pole face 122.

In operation, the effective air gap equates to the sum of air gaps Ra 134 and Rb 136. The equivalent air gap varies dimensionally radially, generally along axis X, between a minimum depicted in the +15 degree end of travel in FIG. 6D and a maximum depicted in the −15 degree end of travel in FIG. 6B. The Hall effect device will operate to measure the intensity of flux lines passing there through and will output an electrical signal through connector assembly 96 which varies as a function of the size of the effective air gap (Ra+Rb) which, in turn, is a direct measure of the relative angular position between the vehicle frame 12 and the control arm assembly 36.

Figure 9:
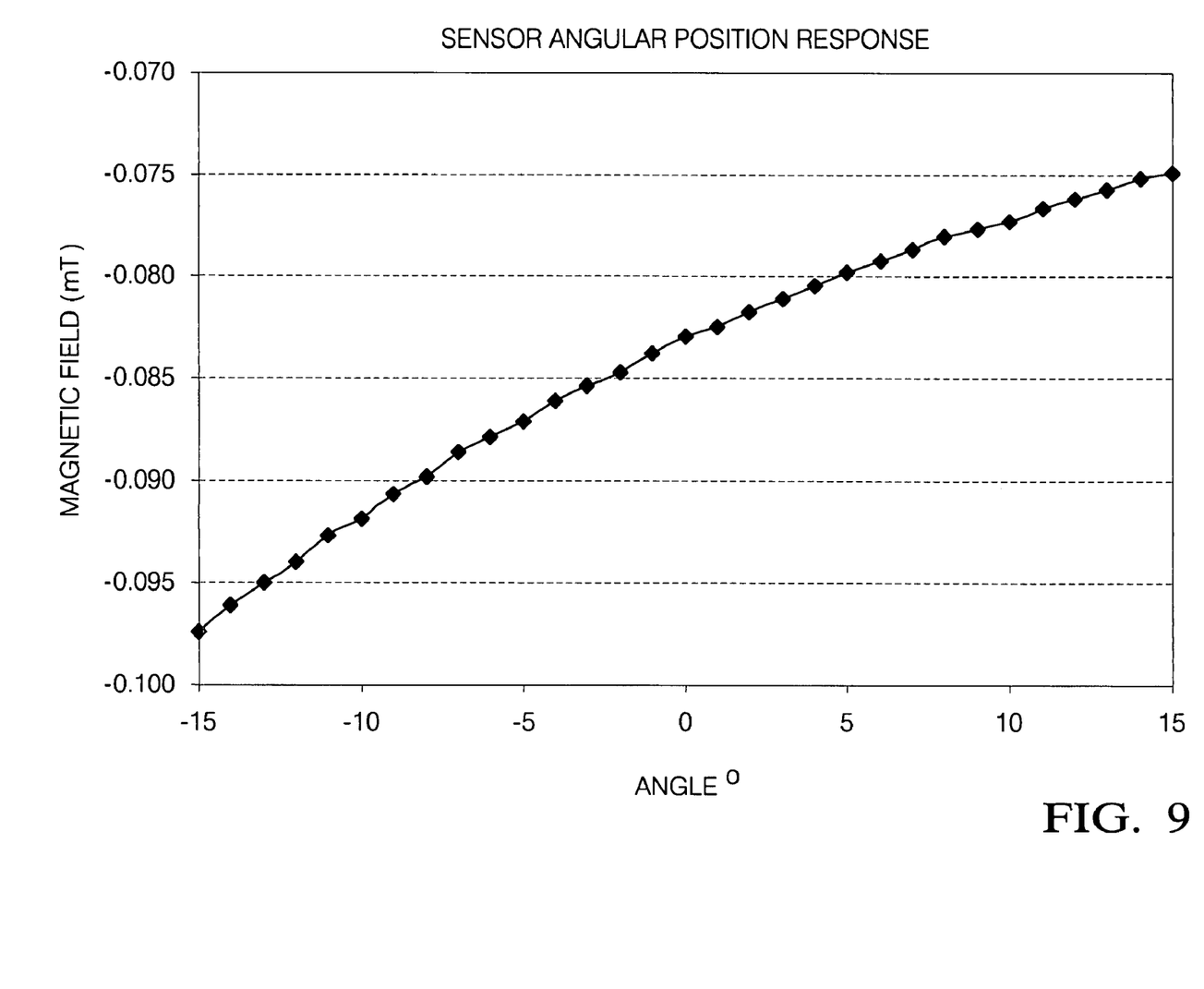
FIG. 9, is a plot of an exemplary magnetic flux response of a magnetic sensor embodying aspects of the present invention depicted in FIGS. 1 through 8C as a function the relative angular position of the sensor stator and rotor.

Referring to FIG. 9, a plot of an exemplary magnetic flux response of one embodiment of an angular position sensor 62 embodying aspects of the bushing assembly 42 depicted in FIGS. 2-5 between limits of travel is illustrated. Thus, it will be appreciated that a sensor 62 embodying aspects of the present invention is able to provide a substantially linear output over its entire range of displacement. The plot of FIG. 9 is non-optimized for the proposed configuration. It is contemplated that any non-linearities in the sensor output can be reduced by optimizing the shapes and relative spacings of the stator and rotor pole faces.

Although the bushing assembly 42 and angular position sensor assembly 62 are ideally subjected only to torsional loads resulting in +15 degree and −15 degree excursions of the rotor ring 104 from the relaxed position illustrated in FIGS. 4, 5, 6A, 7A and 8A, in application, one would expect the host vehicle suspension system to occasionally be subjected to momentary high impact loads in almost any direction. As such impulse loads are transmitted through the control arm assembly, and thus the bushing assembly 42, the resilient characteristic of elastomaric member 54 will result in momentary misalignment of the internal bushing tube 52 and the external bushing tube 50. Under these circumstances, the rotor ring 104 can be displaced in either direction along the X, Y or Z axis, or a combination thereof. These phenomena can result in momentary misalignment of the stator assembly 102 and stator ring 104 of the position sensor 62.

A significant advantage of the present invention is that the bushing assembly, including the position sensor 62, is extremely robust and will not be readily damaged or induce measurement errors of the position sensor 62 as a result of such abuse. Furthermore, limited momentary shock overloading effects are offset by a compensation feature inherent in the position sensor 62 design.

Figure 7B:
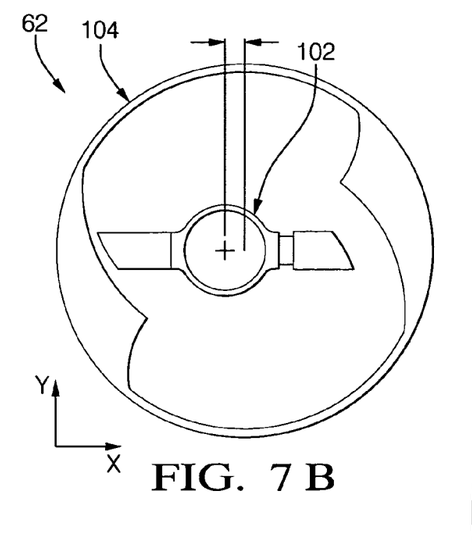
FIG. 7B, is a top plan view similar to that of FIG. 7A, but with the rotor displaced in the positive direction along the x-axis.

FIG. 7A is essentially a reprise of FIG. 6A, showing the at rest positional orientation of the stator assembly 102 and rotor ring 104. FIG. 7B illustrates the result of a shock induced displacement of the rotor ring 104 along the X axis in the +direction. Although there will be a momentary asymmetry of the dimensions of air gaps Ra 134 and Rb 136, they will be largely offsetting, resulting in little net change in the effective air gap dimension. Thus, there will be little resulting measurement error.

Figure 7C:
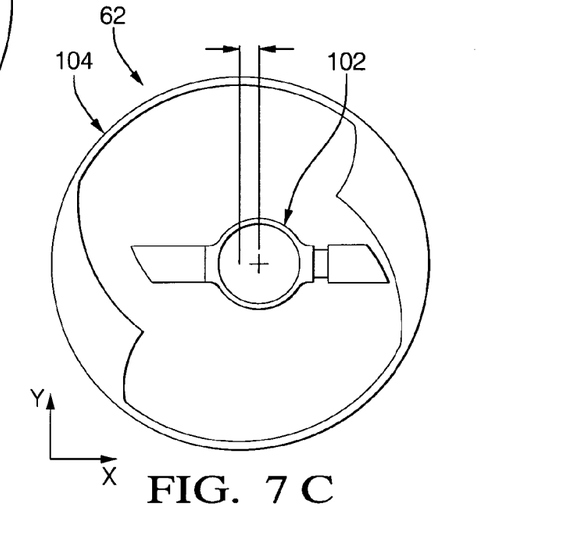
FIG. 7C, is a top plan view similar to that of FIG. 7A, but with the rotor displaced in the negative direction along the x-axis.

FIG. 7C illustrates the opposite effect, wherein the rotor ring 104 is offset along the −direction on the X axis. Again, there will be negligible resulting measurement error.

Figure 7D:
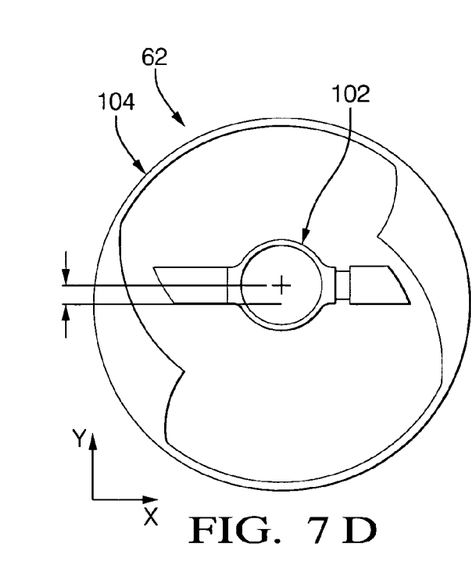
FIG. 7D, is a top plan view similar to that of FIG. 7A, but with the rotor displaced in the negative direction along the y-axis.
Figure 7E:
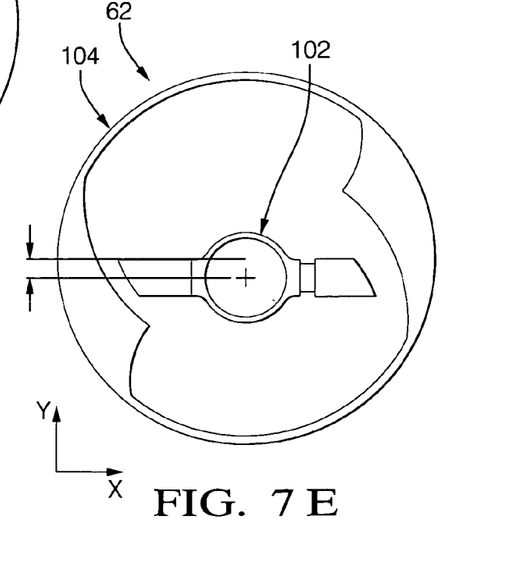
FIG. 7E, is a top plan view similar to that of FIG. 7A, but with the rotor displaced in the positive direction along the y-axis.

FIG. 7D illustrates the result of a shock induces displacement of the rotor ring 104 along the Y axis in the −direction. FIG. 7E illustrates the opposite effect, wherein the rotor ring 104 is offset along the +direction on the Y axis. In both cases, as before, there will be negligible resulting measurement error inasmuch as the effective composite air gap (Ra+Rb) remains substantially constant.

Figure 8A:
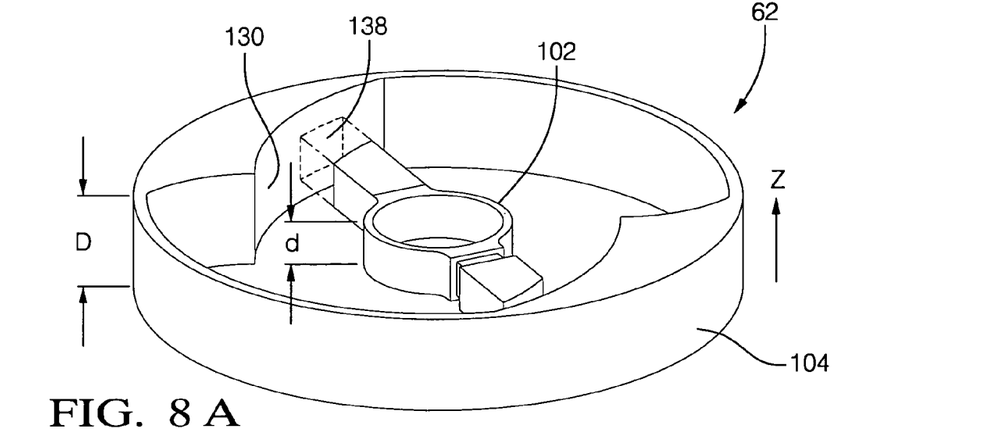
FIG. 8A, is a perspective view of the sensor assembly of FIG. 5, from a different angle.
Figure 8B:
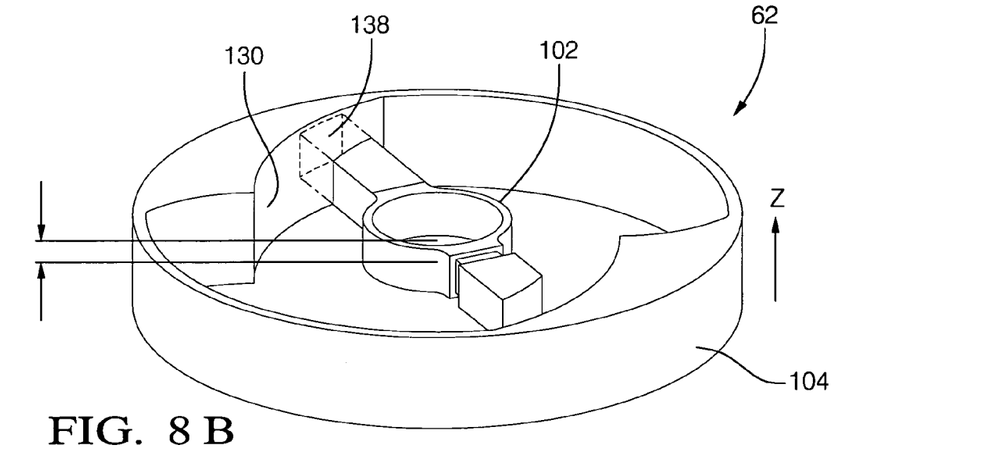
FIG. 8B, is a perspective view of the sensor assembly of FIG. 8A, but with the stator displaced in the negative direction along the z-axis.
Figure 8C:
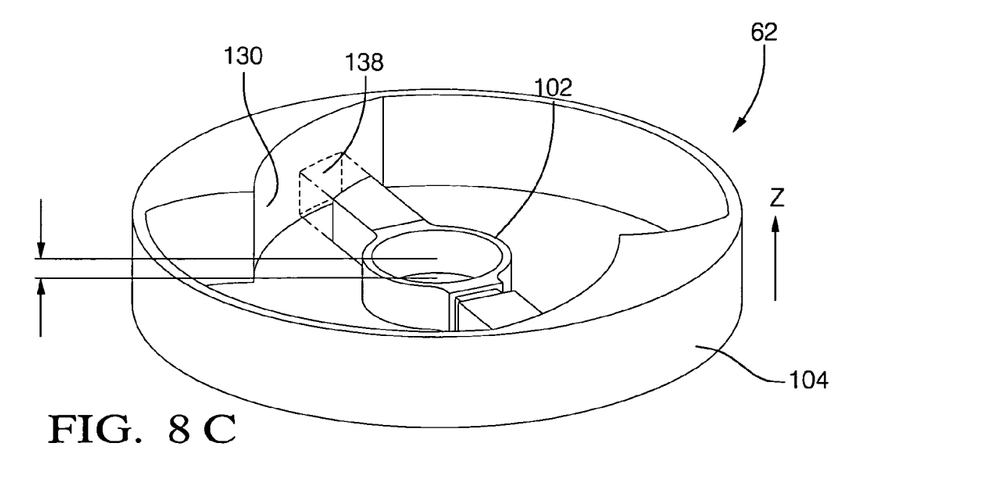
FIG. 8C, is a perspective view of the sensor assembly of FIG. 8A, but with the stator displaced in the positive direction along the z-axis.

FIGS. 8A, 8B and 8C illustrate the result of shock induced loading along the Z axis (which corresponds with the X-X' axis illustrated in FIG. 3). FIG. 8A shows the at rest positional orientation of the stator assembly 102 and the rotor ring 104. FIG. 8B illustrates the result of a shock induced displacement of the rotor ring 104 along the Z axis in the +direction.

FIG. 8C illustrates the result of a shock induced displacement of the rotor ring 104 along the Z axis in the −direction.

In FIG. 8A, the extension shadow 138 of the permanent magnet 106 of stator assembly 102 falls upon the rotor pole face 130 of pole 126 and illustrates that the stator assembly 102 and rotor ring 104 are precisely registered. Momentary displacement along the Z axis in the +and −directions are depicted in FIGS. 8B and 8C, respectively. The rotor ring 104 has an axial dimension D, which is significantly greater than the axial dimension d of the stator assembly 102. As long as the extension shadow 138 is fully outlined on pole face 130, the complete, continuous registration of the stator pole face 122 and rotor pole face 130 is confirmed. Therefore, there will be no change of flux sensed by the Hall sensor 108, and no adverse impact on the accuracy of measurement of the position sensor 62 as a result of the excursions depicted in FIGS. 8B and 8C.

As an additional feature, the extra axial dimension D of rotor ring 104 vis-à-vis the lesser axial dimension d of the stator assembly 102 allows for a greater degree of tolerance to slight mispositioning of the two during the manufacturing process.

Figure 10:
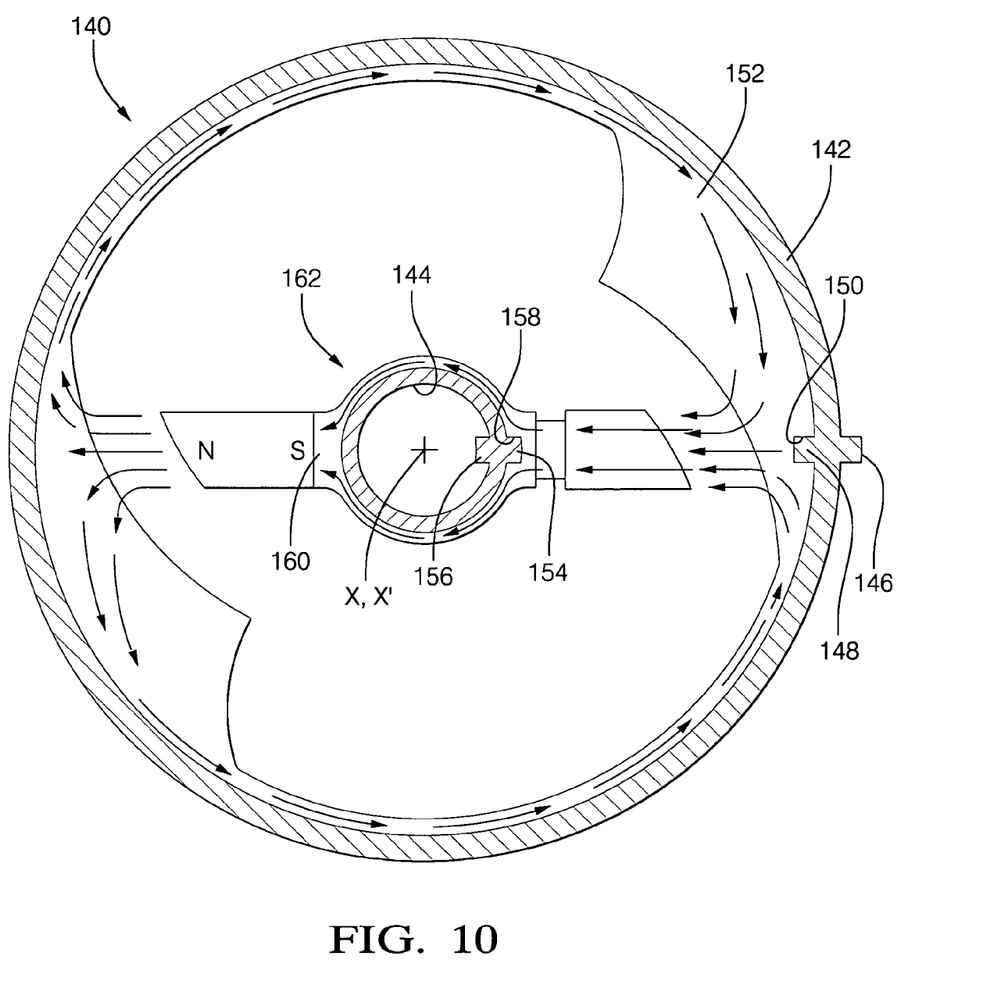
FIG. 10, is a cross-sectional view of an alternative embodiment of the sensor assembly.

Referring to FIG. 10, an alternative embodiment of the present invention is illustrated. A bushing assembly 140 comprises a cylindrical external bushing tube 142 and a concentrically disposed internal bushing tube 144. Bushing tubes 142 and 144 are interconnected by an elastomeric member (not illustrated) as described hereinabove.

Bushing assembly 140 is configured and functions substantially as described hereinabove in connection with the embodiment of the invention illustrated in FIGS. 2-9. The sole differences are described herein below.

External bushing tube 142 defines opposed radially outwardly directed and radially inwardly directed flanges 146 and 148, respectively, extending substantially parallel to the axis X-X' of bushing assembly 140. Flange 148 nests within a mating axially extending groove 150 formed in the outer circumferential surface of the rotor ring 152 to ensure keyed interconnection there between to prevent relative rotation. Likewise, flange 146, in application, nests within a mating axially extending groove (not illustrated) formed in the mating structure of the host vehicle control arm assembly (not illustrated) to ensure keyed interconnection there between to prevent relative rotation.

In similar fashion, internal bushing tube 144 defines opposed radially outwardly directed and inwardly directed flanges 154 and 156, respectively, extending substantially parallel to the axis X-X' of bushing assembly 140. Flange 154 nests within a mating axially extending groove 158 formed in the inner circumferential surface of the first flux guide element 160 of the stator assembly 162 to ensure keyed interconnection there between to prevent relative rotation. Likewise, flange 156, in application, nests within a mating axially extending groove (not illustrated) formed in the mating horizontal pin (not illustrated) joining the bushing assembly 140 to the host vehicle frame (not illustrated) to ensure keyed interconnection there between to prevent relative rotation.

The above described system of mating flanges and grooves provide substantial additional robustness to the overall design of the present invention. Knurled surfaces or other suitable attachment techniques can also be substituted.

It is to be understood that the invention has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the permanent magnets and flux concentrators. For example, the concentrators can be constructed from any number of metallic and composite materials exhibiting ferromagnetic properties. Accordingly, the forgoing is not to be construed in a limiting sense.

The invention has been described in an illustrative manner, and it is to be understood that the terminology, which has been used is intended to be in the nature of words of description rather that of limitation.

Obviously, many modifications and variations of the present invention are possible in light of the above teachings. For example, although the angular position assembly 62 is preferably centered axially within external bushing tube 50, it could be located offset towards one axial end thereof and, if desired, partially exposed to the environment to facilitate servicing or electrical connection access. Furthermore, the number of cooperating stator and rotor pole sets can be varied from one to a number greater that two. Should a single air gap configuration be chosen, a flexible interconnection must be provided between the rotor flux guide and the stator flux guide. It is, therefore, to be understood that within the scope of the appended claims, wherein reference numerals are merely for illustrative purposes and convenience and are not to be in any way limiting, the invention, which is defined by the following claims as interpreted according to the principles of patent law, including the Doctrine of Equivalents, may be practiced otherwise than as specifically described.

What is claimed:

1. A bushing assembly comprising:
    an outer, generally cylindrical member forming an inner circumferential surface;
    an inner, generally cylindrical member forming an outer circumferential surface arranged substantially concentrically with said outer member;
    a substantially solid elastomeric member disposed between and interconnecting said inner and outer members, said elastomeric member having an outer circumferential surface affixed to the inner circumferential surface of said outer member and an inner circumferential surface affixed to the outer circumferential surface of said inner member,
    said cylindrical members and elastomeric member forming a sealed annular recess extending radially between the inner circumferential surface of said outer member and the outer circumferential surface of said inner member; and
    a sensor, operative to produce an output signal indicative of the relative angular position of said inner and outer members, said sensor including a stator carried for rotation with said inner member within said recess and a rotor carried for rotation with said outer member within said recess.

2. The busing assembly of claim 1, wherein said inner and outer members are elongated along a common axis of revolution.

3. The bushing assembly of claim 2, wherein said elastomeric member comprises first and second elastomeric member portions which form said sensor receiving recess therebetween.

4. The bushing assembly of claim 1, wherein said sensor is contactless.

5. The bushing assembly of claim 1, wherein said stator and rotor are axially aligned for relative movement to effect said output signal in response to relative rotational displacement between said inner and outer members.

6. The bushing assembly of claim 1, wherein said elastomeric member is bonded to said inner and outer cylindrical members.

7. The bushing assembly of claim 1, wherein said elastomeric member is fabricated from rubber.

8. The bushing assembly of claim 1, wherein said inner and outer members are made from a metallic material.

9. The bushing assembly of claim 1, further comprising position indicating means disposed on an outer surface of one of said cylindrical members.

10. The bushing assembly of claim 1, further comprising position indicating means disposed on an outer surface of both said inner and outer members.

11. The bushing assembly of claim 1, further comprising means operative to circumferentially fix the inner member and said stator.

12. The bushing assembly of claim 1, further comprising means operative to circumferentially fix the outer member and said rotor.

13. The bushing assembly of claim 1, further comprising an electrical connector carried with said inner member adjacent one end thereof, said electrical connector in-circuit with said sensor.

14. The bushing assembly of claim 1, wherein said elastomeric member includes first and second axially spaced elastomeric portions.

15. The bushing assembly of claim 14, wherein said sensor is disposed intermediate said first and second elastomeric portions.

16. A bushing assembly adapted for joining first and second structural members for relative rotation about an axis, said bushing assembly comprising:
    an outer, generally cylindrical member;
    first engagement means operative to fixedly secure said outer cylindrical member for movement with said first structural member;
    an inner, generally cylindrical member arranged substantially concentrically about said axis within said outer cylindrical member;
    second engagement means operative to fixedly secure said inner cylindrical member for movement with said second structural member;
    a substantially solid elastomeric member disposed between and interconnecting said inner and outer cylindrical members, said cylindrical members and elastomeric member forming a sealed recess extending radially between the inner and outer cylindrical members; and
    an angular position sensor juxtaposed between said inner and outer sleeves within said recess and operative to produce an output signal indicative of the relative angular position of said first and second structural members, said sensor including a stator carried for rotation with one of said cylindrical members within said recess and a rotor carried for rotation with the other of said cylindrical members within said recess.

17. A bushing assembly for joining sprung and unsprung elements of a suspension system for an automotive vehicle comprising:

an outer, generally cylindrical member;

first engagement means operative to fixedly secure said outer cylindrical member for movement with one of said suspension elements;

an inner, generally cylindrical member arranged substantially concentrically about said axis within said outer cylindrical member;

second engagement means operative to fixedly secure said inner cylindrical member for movement with the other of said suspension elements;

a substantially solid elastomeric member disposed between and interconnecting said inner and outer cylindrical members, said cylindrical members and elastomeric member forming a sealed recess extending radially between the inner and outer cylindrical members; and an angular position sensor juxtaposed between said inner and outer sleeves within said recess and operative to produce an output signal indicative of the relative angular position of said sprung and unsprung suspension elements, said sensor including a stator carried for rotation with one of said cylindrical members within said recess and a rotor carried for rotation with the other of said cylindrical members within said recess.

18. The bushing assembly of claim 17, wherein said inner and outer sleeves are formed of a hardened material.

19. The bushing assembly of claim 17, wherein said outer sleeve includes an outwardly extending circumferential flange at one end thereof operative to limit axial positioning thereof with respect to said first structural member.

* * * * *